US007742790B2

(12) United States Patent
Konchitsky et al.

(10) Patent No.: US 7,742,790 B2
(45) Date of Patent: Jun. 22, 2010

(54) ENVIRONMENTAL NOISE REDUCTION AND CANCELLATION FOR A COMMUNICATION DEVICE INCLUDING FOR A WIRELESS AND CELLULAR TELEPHONE

(75) Inventors: Alon Konchitsky, 20488 Stevens Creek Blvd. Apt. 1402, Cupertino, CA (US) 95014; William Martin Ribble, San Jose, CA (US)

(73) Assignee: Alon Konchitsky, Santa Clara, CA (US)

( * ) Notice: Subject to any disclaimer, the term of this patent is extended or adjusted under 35 U.S.C. 154(b) by 455 days.

(21) Appl. No.: 11/749,927

(22) Filed: May 17, 2007

(65) Prior Publication Data

US 2007/0274552 A1 Nov. 29, 2007

Related U.S. Application Data

(60) Provisional application No. 60/808,169, filed on May 23, 2006.

(51) Int. Cl.
*H04B 1/38* (2006.01)

(52) U.S. Cl. ........................ 455/570; 381/92; 381/94.1; 455/550.1; 379/388.03

(58) Field of Classification Search ................. 381/122, 381/338, 337, 2–4, 71.1, 71.6, 91, 92, 110, 381/94.1–94.3, 55–57, 94.7, 94.8, 123, 94.5, 381/104, 107; 704/225, 200; 379/406.01–406.06, 379/387.01, 392.01, 395; 455/73, 570, 569.1, 455/550.1

See application file for complete search history.

(56) References Cited

U.S. PATENT DOCUMENTS

| | | | | |
|---|---|---|---|---|
| 3,810,067 | A * | 5/1974 | Heidecker | 327/167 |
| 5,969,838 | A | 10/1999 | Paritsky | |
| 6,185,300 | B1 * | 2/2001 | Romesburg | 379/406.09 |
| 6,415,034 | B1 | 7/2002 | Hietanen | |
| 6,505,057 | B1 * | 1/2003 | Finn et al. | 455/569.2 |
| 6,978,010 | B1 * | 12/2005 | Short et al. | 379/388.03 |
| 7,058,368 | B2 * | 6/2006 | Nicholls et al. | 455/114.2 |
| 2007/0263847 | A1 * | 11/2007 | Konchitsky | 379/392.01 |

* cited by examiner

*Primary Examiner*—Vivian Chin
*Assistant Examiner*—Lun-See Lao
(74) *Attorney, Agent, or Firm*—Steven A. Nielsen; Allman & Nielsen, PC

(57) ABSTRACT

Various embodiments of the present invention enable a system and method for reducing or entirely canceling background or environmental noise from a voice transmission from a communications device. A communications device, such as a mobile telephone, is configured with an environmental noise compensation, correction, or counterbalanced (correction) signal generator that is connected between at least one microphone and a continuous time quadrant multiplication. Optional discrete time or digital signal processing may be applied. The original output of the at least one microphone and a compensation, correction, or counterbalanced or counter-balancing signal generated by the environmental noise compensation, correction, or counterbalanced signal generator are mixed or otherwise combined together after being received by the antenna to the receiver.

7 Claims, 5 Drawing Sheets

ENVIRONMENTAL NOISE REDUCTION AND CANCELLATION FOR A COMMUNICATION DEVICE INCLUDING FOR A WIRELESS AND CELLULAR TELEPHONE

RELATED APPLICATIONS

This application claims priority to U.S. Provisional Patent Application No. 60/808,169, filed May 23, 2006, and entitled "ENVIRONMENTAL NOISE REDUCTION AND CANCELLATION FOR A COMMUNICATION DEVICE INCLUDING FOR A WIRELESS AND CELLULAR TELEPHONE," by Alon Konchitsky, and is hereby incorporated herein by reference.

BACKGROUND

1. Field of the Invention

The present invention relates generally to voice communication systems, devices, telephones, and methods, and more specifically, to systems, devices, and methods that automate control in order to correct for variable environmental noise levels and reduce or cancel the environmental noise after receiving the voice communication over one or a plurality of communication links.

2. Background of the Invention

Voice communication devices such as cellular telephones and wireless telephones and communications devices other than cellular telephones have become ubiquitous; they show up in almost every environment. These systems and devices and their associated communication methods are referred to by a variety of names, such as but not limited to, cellular telephones, cell phones, mobile phones, wireless telephones in the home and the office, and devices such as personal data assistants (PDAs) that include a wireless or cellular telephone communication capability. They are used in the home, at the office, in the car, on a train, at the airport, at the beach, at restaurants and bars, on the street, and almost any other imaginable venue. As might be expected, these diverse environments have relatively higher and lower levels of background, ambient, or environmental noise. For example, there is generally less noise in a quiet home than there is in a crowded bar. And, this noise is picked up by the microphone of the communications device and if at sufficient levels, degrades the intended voice communication. Although the invention described hereinafter is applicable to many different communication systems and devices, examples focus on cellular communication networks and devices for purposes of explaining the underlying problems and solutions.

A cellular network is a radio network made up of a number of radio cells (or just cells) each served by a fixed transmitter, normally known as a base station. These cells are used to cover different geographical areas in order to provide radio coverage over a wider geographical area than the area of one cell. Cellular networks are inherently asymmetric with a set of fixed main transceivers each serving a cell and a set of distributed (generally, but not always, mobile) transceivers which provide services to the network's users.

The primary requirement for a cellular network is that the each of the distributed stations need to distinguish signals from their own transmitter from the signals from other transmitters. There are two common solutions to this requirement, frequency division multiple access (FDMA) and code division multiple access (CDMA). FDMA works by using a different frequency for each neighboring cell. By tuning to the frequency of a chosen cell, the distributed stations can avoid the signal from other neighbors. The principle of CDMA is more complex, but achieves the same result; the distributed transceivers can select one cell and listen to it. Other available methods of multiplexing such as polarization division multiple access (PDMA) and time division multiple access (TDMA) cannot be used to separate signals from one cell to the next since the effects of both vary with position, making signal separation practically impossible. Orthogonal frequency division multiplex (OFDM) in principal, consists of frequencies orthogonal to each other. Time division multiple access, however, is used in combination with either FDMA or CDMA in a number of systems to give multiple channels within the coverage area of a single cell.

In the case of a typical taxi company, each radio has a selector knob or button. The knob or button acts as a channel selector and allows the radio to tune to different frequencies. As the drivers and their vehicles move around, they change from channel to channel. The drivers know which frequency covers approximately what area, when they don't get a signal from the previously selected transmitter, they may typically also try other channels until they find one which works or on which they are able to receive or monitor communications in their local area. Usually, the taxi drivers only speak one at a time, as invited by the operator or according to voice traffic on the channel, in a sense time division multiplexed system.

The wireless world comprises the following exemplary, but not limited communication schemes: time based and code based. In the cellular mobile environment these techniques are named under TDMA (time division multiple access) which comprises but not limited to the following standards GSM, GPRS, EDGE, IS-136, PDC, and the like; and CDMA (code division multiple access) which comprises but not limited to the following standards: CDMA one, IS-95A, IS-95B, CDMA 2000, CDMA 1xEvDv, CDMA 1xEvDo, WCDMA, UMTS, TD-CDMA, TD-SCDMA, OFDM, WiMax, WiFi, and others).

For the code division based standards or orthogonal frequency division, as the number of subscribers grows and average minutes per month increase, more and more mobile calls typically originate and terminate in noisy environments. The background or ambient noise degrades voice quality.

For the time based schemes, like GSM or GPRS or Edge schemes, improving the end-user voice signal-to-noise ratio (SNR), improves the listening experience for users of existing TDMA (time division multiple access) based networks, by improving the received speech quality by employing background noise reduction or cancellation at the sending or transmitting device.

Significantly, in an on-going cellular telephone call or other communication received in an environment having relatively higher environmental noise, it is sometimes difficult for the party at the receiving end of the connection in the noisy environment to hear what the transmitting party is saying. Problems associated with environmental noise on the transmitting or speaking person's side are an additional problem and addressed in the inventor's other patent applications, but not addressed here.

With further reference to the receiver or listener side, the local ambient or environmental noise in the receiving environment often "drowns out" or overwhelms the received wired, cellular, or VOIP telephone user's signal, so that the receiving party cannot hear what is being said or even if they can hear it with sufficient volume the voice or speech is not completely understandable.

Attempts to solve this problem have largely been unsuccessful. Both single microphone and two microphone approaches have been attempted. For example, U.S. Pat. No. 6,415,034 (the "Hietanen patent") describes the use of a second background noise microphone located within an earphone unit or behind an ear capsule. Digital signal processing is used to create a noise canceling signal which enters the speech microphone. Unfortunately, the effectiveness of the method disclosed in the Hietanen patent is compromised by acoustical leakage, that is where ambient or environmental noise leaks past the ear capsule and into the speech microphone. The Hietanen patent also relies upon complex and power consuming expensive digital circuitry that may generally not be suitable for small portable battery powered devices such as pocketable cellular telephones. Another example is U.S. Pat. No. 5,969,838 (the "Paritsky patent") which discloses a noise reduction system utilizing two fiber optic microphones that are placed side-by-side next to one another. Unfortunately, the Paritsky patent discloses a system using light guides and other relatively expensive and/or fragile components not suitable for the rigors of cell phones and other mobile devices. Neither Paritsky nor Hietanen address the need to increase capacity in cellular telephone-based communication systems.

Therefore, there is a need in the art for a method of noise reduction or cancellation on the receiving end of a call that is robust, suitable for mobile use, and inexpensive to manufacture.

SUMMARY OF THE INVENTION

The present invention provides a novel system and method for monitoring the noise in the environment in which a cellular telephone is operating and canceling the environmental noise so that the receiving party of the voice communication link can more easily hear what the wired or wireless, corded or cordless, cellular, VOIP, or any other type telephone calling user is saying.

The present invention preferably employs noise reduction and or cancellation technology that is operable to attenuate or even eliminate pre-selected portions of an audio spectrum. By monitoring the ambient or environmental noise in the location in which the cellular telephone is operating and applying noise reduction and/or cancellation protocols at the appropriate time, it is possible to significantly reduce the ambient or background noise to which the receiver to a cellular telephone call might be subjected.

In one aspect of the invention, the invention provides a system and method that enhances the convenience of using a communications device, such as a wired or wireless, corded or cordless, cellular, VOIP, or any other type, even in a location having relatively loud ambient or environmental noise.

In another aspect of the invention, the invention provides a system and method for canceling ambient or environmental noise that is present in the environment of a party listening to a spoken voice or other content on a communication device after it is received.

In yet another aspect of the invention, the invention monitors ambient or environmental noise at the location of the receiver or listener via a second microphone different from the conventional transmit microphone intended to pick up primarily spoken voice for transmission to another location, where the second microphone is primarily responsible for picking up background, ambient, and/or environmental noise from the local listening environment and used to reduce, cancel, and/or compensate or correct for local noise.

In still another aspect of the invention, the invention optionally provides an enable/disable switch on a communications device such as a cellular telephone device to enable/disable the noise reduction and or cancellation features of the invention.

In yet another embodiment a single microphone is used for both collection and conversion of the local user's speech to an electrical signal when the user is talking and as the microphone transducer for collecting the environmental or background noise when the user is listening. A switch or switching logic may automatically or manually be used to change between the two microphone use modes.

In yet another embodiment first and second microphones are used, one for the collection and conversion of the local user's speech to an electrical signal when the user is talking and a second microphone for collecting the environmental or background noise when the user is listening. No switch is needed in this mode as each microphone is provided for its separate purpose.

In still another aspect, the invention provides a noise processing apparatus for use in a communications device In still another aspect, the invention provides a method for canceling noise while listening to a spoken voice in a communications device.

These and other aspects of the present invention will become apparent upon reading the following detailed description in conjunction with the associated drawings.

DETAILED DESCRIPTION OF EMBODIMENTS OF THE INVENTION

The present invention provides a unique background noise or environmental noise reduction and or cancellation feature for a communications device such as a mobile or cellular telephone, corded or cordless telephone, conventional wire line or wireless telephone, or any other communications device having a microphone input and a speaker transducer output and operating in an environment of background noise. While the present invention has applicability to at least these types of communications devices, the principles of the present invention are particularly applicable to all types of communications devices. For simplicity, the following description employs the terms "mobile telephone" or "cellular telephone" or "communications device" as umbrella terms to describe the embodiments of the present invention, but those skilled in the art will appreciate that the use of such term is not to be considered limiting to the scope of the invention, which is set forth by the claims appearing at the end of this description.

Figure 1:
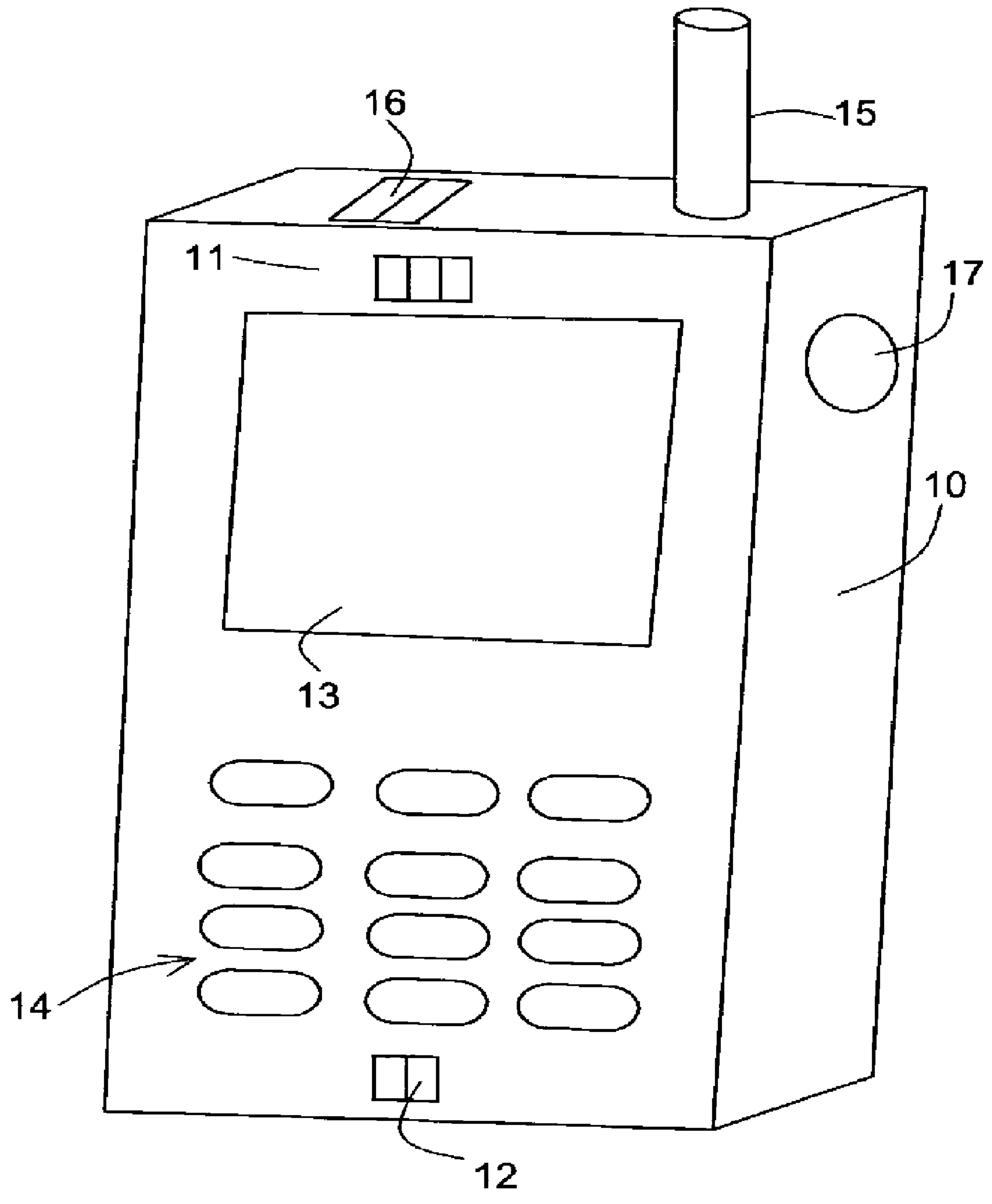
FIG. 1 illustrates an exemplary communications device, such as a wireless mobile telephone, that includes an optional second microphone for sampling environmental noise and an optional enable/disable button in accordance with an embodiment of the present invention.

FIG. 1 illustrates an exemplary mobile or stationary communications device, such as a mobile or cellular telephone 10 or any other communications device that comprises a first microphone 12, a speaker 11, an optional display screen 13, an optional keypad 14, an optional antenna 15, and a housing 18 having an outer surface 19. Optionally, a second microphone 16 for either continuous time or discrete time sampling environmental noise level and an environmental noise counterbalanced (correction) enable/disable button 17 may also be provided. The enable/disable button or feature 17 may be exposed on the surface of the housing or be available through a menu driven options or telephone set up procedure, or automatic detection logic may enable the telephone 10 to automatically identify periods where the user is speaking and periods of time where the user is listening and switch between microphone configurations. This optional second microphone 16, and optional enable/disable button or feature 17 will be described more fully below relative to particular embodiments of the invention. These latter two elements, the second optional microphone 16 and the enable/disable button and associated circuits and/or logic, will be described more fully below. Those skilled in the art will appreciate that speaker transducer 11 could be replaced by an ear piece or by two ear pieces, head-set, or other electrical signal to acoustic transducer (not shown) that is worn by the mobile, cellular, fixed or stationary, or other telephone or communications device user. Speaker 11 is used herein to mean the device by which sound (such as in the form of an acoustic pressure wave) is transferred from the mobile or fixed communications device telephone (typically in the form of a digital or electrical signal that is converted into an acoustic or pressure wave signal) to the user, and more specifically to one or both of a user's ear(s). Also, optional display screen 13 may optionally be a touch screen display or other interface and display when provided, which might optionally incorporate keypad 14 or other interface as well as optional enable/disable button 17. Various other different interfaces may be utilized as are known in the art.

Figure 2A:
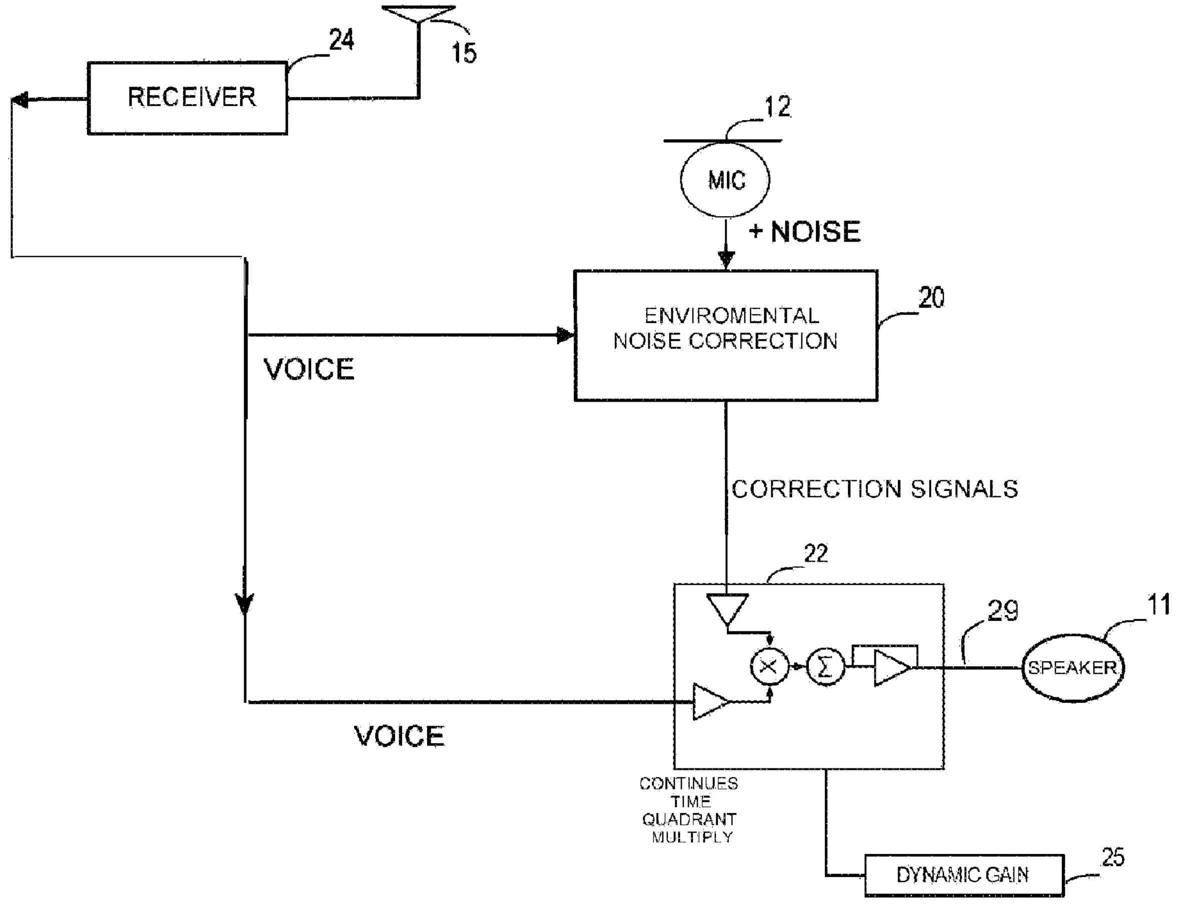
FIG. 2(*a*)-(*c*) illustrate exemplary embodiments of the present invention having at least a first microphone that is switched to provide both sensing of local spoken speech and during a different period of time to sense local background or environmental noise, and a second embodiment having two separate microphones for these purposes and thereby eliminate any need for the switch.
Figure 2B:
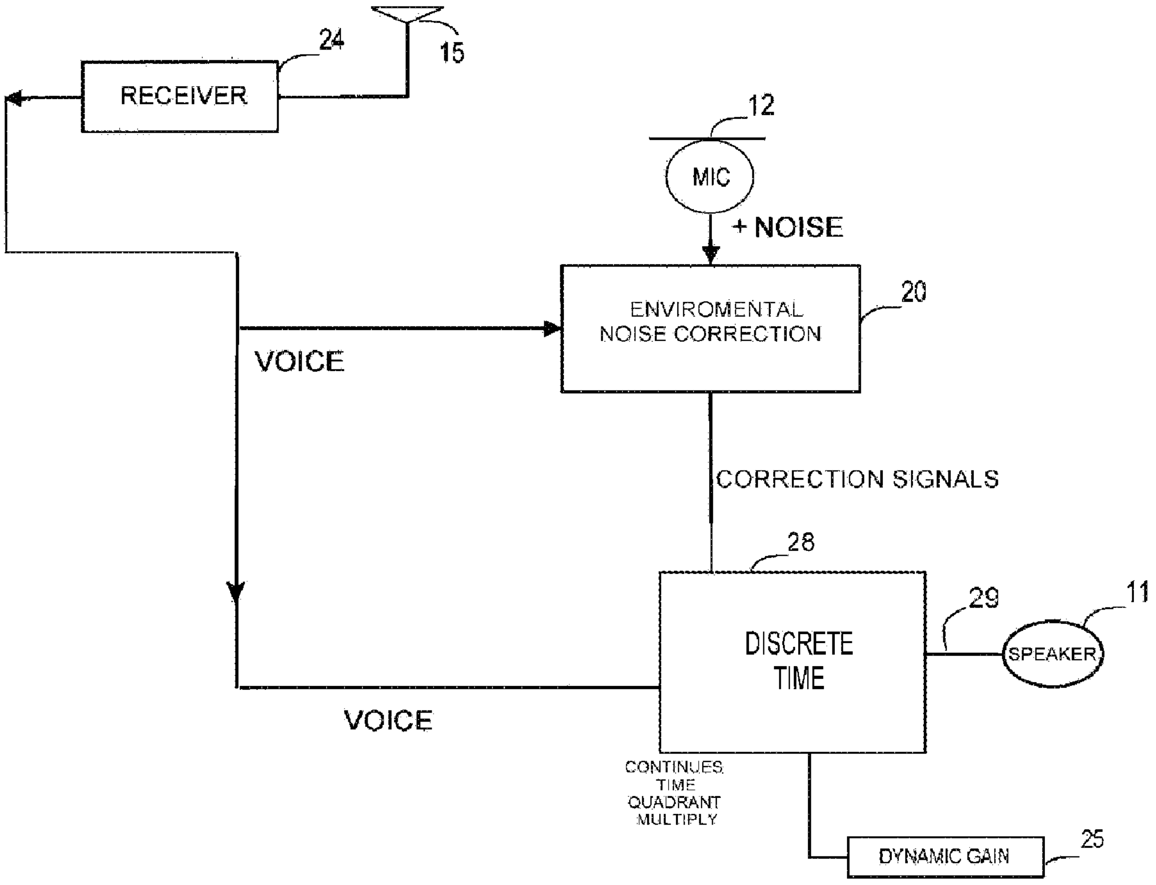
Figure 2C:
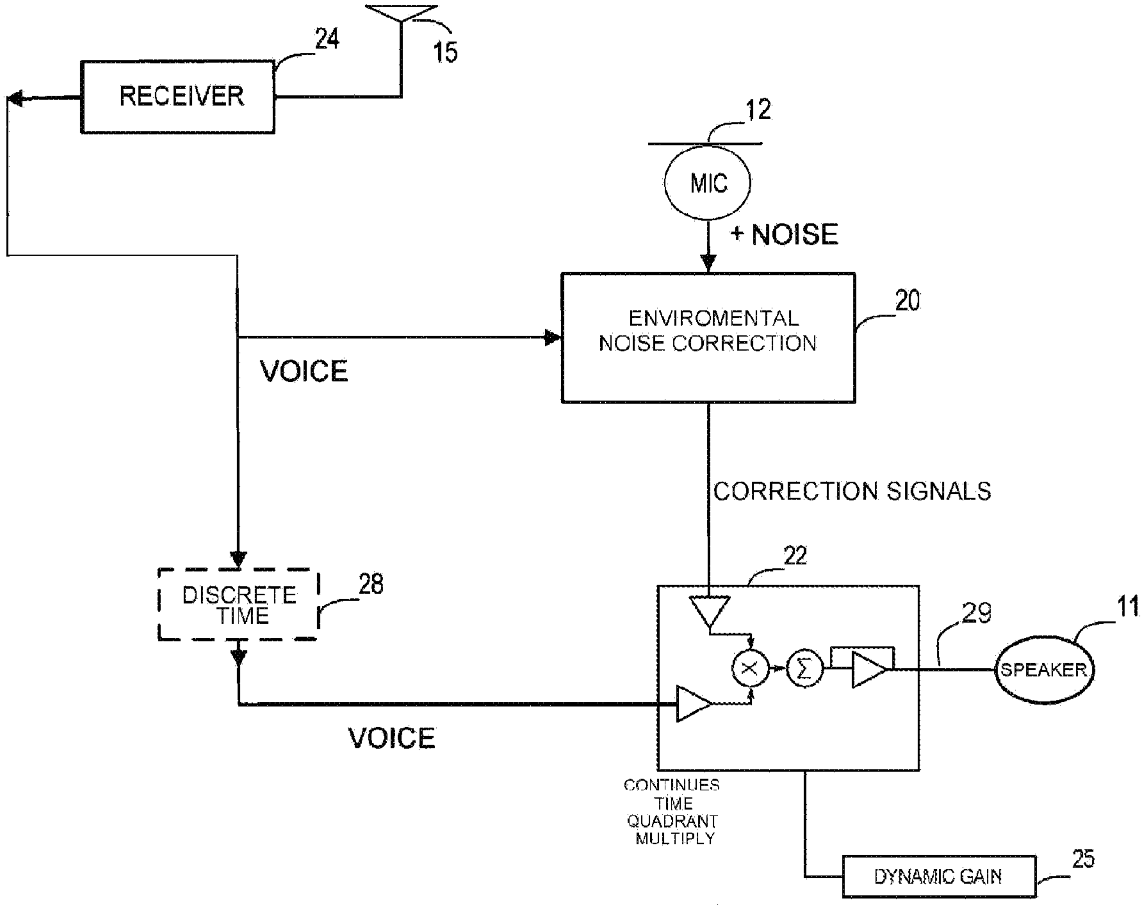

FIG. 2(*a*)-(*c*) illustrate an exemplary embodiments of the present invention including speaker transducer 11, environmental noise compensation, correction and/or counterbalanced or counter balancing signal circuit, or logic, or other generator 20, a continuous time quadrant multiplication (or multiplier) 22 (FIG. 2(*a*)), a discrete time processor 28 (FIG. 2(*b*)), and optional receiver 24, and optional antenna 15.

In accordance with an embodiment of the present invention, local environmental, ambient, or background noise present at the listener's telephone is cancelled or reduced before being combined with the intended voice communication received at the optional antenna 15 and receiver 24 and delivered to the speaker 11 for reproduction as an acoustic or sound wave to the user or listener.

Figure 3:
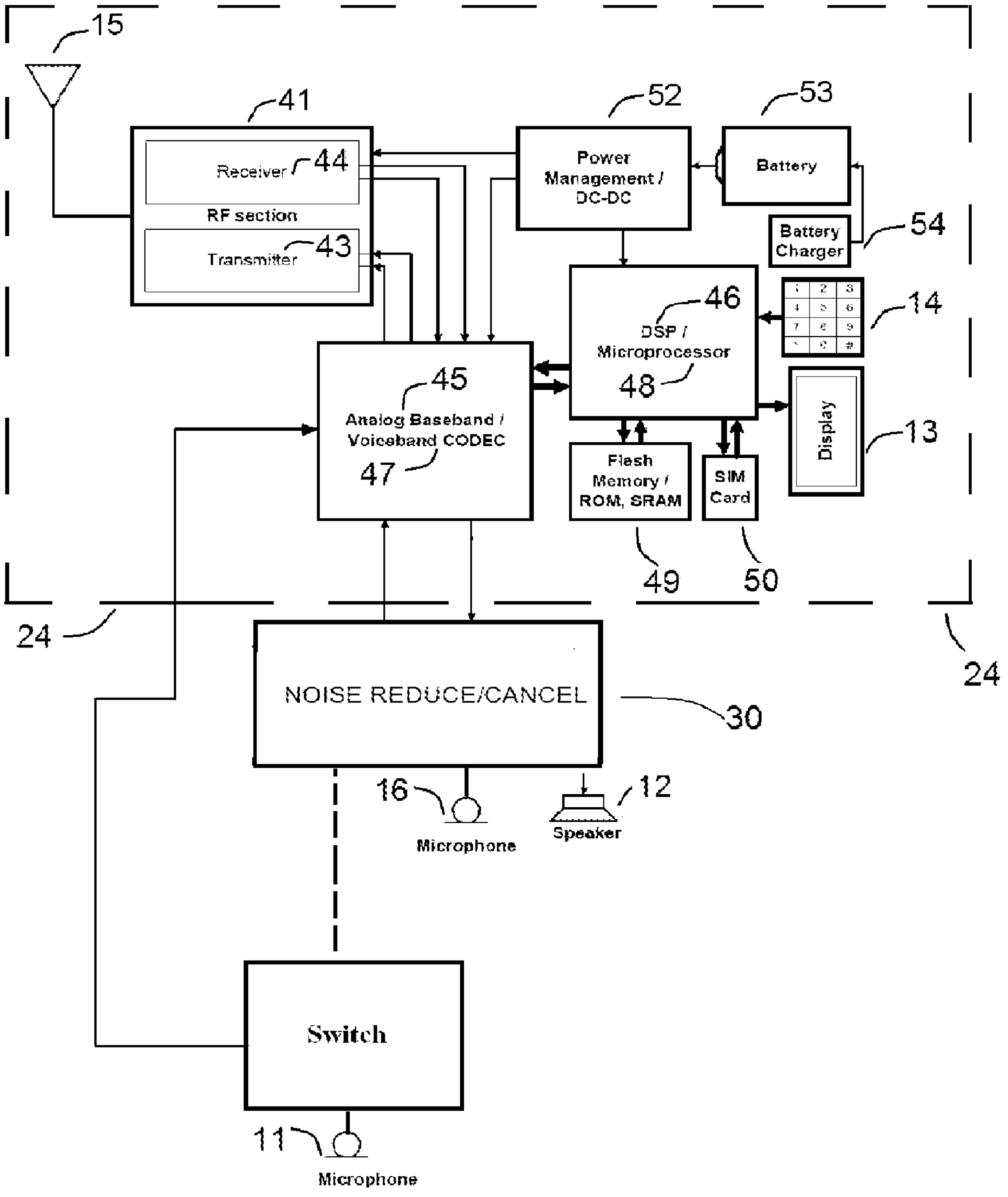
FIG. 3 illustrates yet another exemplary embodiment of the present invention showing in particular the relationship between the inventive noise reduction and/or cancellation block and conventional elements of a typical cellular telephone including the analog baseband/voiceband codec.

More specifically, in a first embodiment, antenna 15 receives a wireless communication over a radio frequency communications link which is processed by receiver 24 to a baseband signal. This baseband signal may for example correspond to the output of an analog baseband/voiceband codec 45, 47 such as illustrated in FIG. 3. The voice output from the receiver is communicated to an environmental noise correction circuit or process 20 which also receives an electrical signal from microphone 12 and generates correction signals based on these two inputs. It will be appreciated that the voice output of the receiver 24 may generally include one or more noise components, such as noise components from the transmit or up-link users side telephone, and/or noise from the communications path or link between the sending and receiving devices, however, it is not these noise components that are addressed in the present invention. The correction signals are communicated to an input port of a continuous time quadrant multiplier circuit or logic 22, which also receives at a second input port the original voice output signal from the receiver as shown in FIG. 2(*a*).

The continuous time quadrant multiplier generates a noise reduced or cancelled signal 29 that is then output to the speaker transducer 11.

An optional fixed or dynamic gain circuit or logic block 25 may optionally be employed to modify a weight, gain, or amplification of one of more of the signals in the continuous time quadrant multiplier 22. This modification of the dynamic gain may be used to adjust the amount or gain of the noise cancellation or could be turned off or shut down if and when desired. A static or fixed gain may alternatively be utilized but is not preferred. In some instances, the gain applied may be positive (e.g., amplification), negative (e.g., attenuation), or unity gain (e.g., gain is unity or no gain, amplification, or attenuation). The gain applied to each of the possible inputs may be independently selected. Typically at least one of the gains will be a non-unity gain at least at selected times of operation.

Environmental noise reduction and or cancellation generator or other circuit 20, in accordance with well-known techniques, generates a correction, compensation, or counterbalancing signal or signals that are operable to attenuate, reduce, or altogether cancel background noise that is not intended or desirable to be heard by the recipient party. These compensation, correction, and/or counterbalanced signals are fed into a continuous time quadrant multiplier 22, where these signals are mixed or otherwise combined or processed with the combined signal coming directly from microphone 12. The result is that the environmental or background noise is eliminated, or at least substantially reduced, before the combined signal (environmental noise plus voice signal) is send to the user or the speaker 12 that is reproducing or transforming the signal that is listened to and ultimately heard by the user.

Alternatively, a discreet time processor 28 such as a digital processor may be utilized in place of (or in addition to) the continuous time quadrant multiplier 22 to provide digital instead of (or in addition to) analog voice processing as shown in FIG. 2(*b*). As is well known in the art of noise reduction and or cancellation, it is possible (for example, via filtering and digital signal processing techniques) to attenuate or even cancel-out pre-selected portions of an audio signal or pre-selected bands of a frequency spectrum, or by other means.

In one embodiment, the discrete time processor 28, such as a discrete time or digital processing block with or without signal processing is provided to delay or slow the progress or delivery of the voice signal from the receiver, so that when the voice signal reaches continuous time quadrant multiplier 22 the arrival time of the voice signal and the correction or compensation or counterbalancing signal generated by environmental noise reduction and or cancellation generator 20, the signals are synchronized as shown in FIG. 2(*c*). Other delay circuits may optionally be provided in the other path to the continuous time quadrant multiplier as may be required to achieve the desired synchronization.

Various techniques for adding and subtracting or otherwise combining two signals are know in the art, such as the use of operational amplifiers, differential amplifiers, comparators, and the like circuits, and these techniques and circuits may be utilized here. The result is that the environmental noise or background noise is eliminated or cancelled, or at least substantially reduced, before the noise reduced combined signal 29 (environmental noise plus voice signal) is passed to speaker transducer 11.

With reference to FIG. 3, there is illustrated an embodiment of the invention which illustrated the relationship between the inventive noise reduction and cancellation block 30 of FIG. 2, and the other conventional components of a typical cellular telephone receiver 24. In this particular embodiment, it may be appreciated that the noise reduction and/or cancellation block 30 is interposed as an interface between the speaker transducer output of the analog baseband/voiceband codec 45, 47 so that a corrected or compensated signal is sent to the cellular telephone device speaker rather than the signal that would have been sent by the conventional cellular telephone. Furthermore, in the single microphone embodiment, microphone 11 is used in two modes, a first mode is the conventional manner of picking up voice from a user and coupling this voice signal to the analog baseband/voiceband codec 45, 47 in conventional manner, and is a second mode where the microphone 11 is switched to disconnect it from the analog baseband/voiceband codec block 45, 47 and to connect it to the noise reduction and/or cancellation block of the invention.

In a alternative embodiment having two microphones, the switch is not required and first microphone 11 is used in conventional manner to provide the usual voice input and second microphone 16 is used to sense and provide an environmental noise input to the noised reduction and cancellation block 30. When two microphones are utilized, their characteristics and placement on the telephone or other communications device may be selected to improve or optimize their performance relative to an intended function.

It may be appreciated that noise local to the speaker's environment on the transmission may or may not have been reduced or cancelled on the transmission side, and that the present invention may be combined with speaker user side noise reduction or cancellation.

In accordance with one aspect of the present invention, environmental noise or background noise is attenuated, reduced, or cancelled from the intended voice communication. It will be appreciated that a theoretical goal is to cancel all ambient or environmental voice and to attenuate none of the speech signal, however, in practice it is inevitable that some environmental noise may remain and/or that some speech signal may be attenuated. Therefore, it will be understood that references to canceling noise refer to reduction of noise with the goal of eliminating the noise.

In one embodiment, the continuous time quadrant multiplier 22, two single ended inputs (or optionally differential inputs), and are followed by voltage-to-current or other signal conversion circuits that generate signals suitable for input to the continuous time multiplier circuit. The product of these two signals is generated by a continuous time multiplier circuit, followed by a sum circuit that could accept a gain or dynamic gain to increase (amplify) or decrease (attenuate) the output level for the signal cleaned from noise. This cleaned signal is referred to as the enhanced signal in some of the result data described hereinafter in this description. It will be appreciated that where amplification or gain are described in decibels or db, which are logarithmic units, multiplication in non-logarithmic terms becomes a summation in logarithmic terms.

The dynamic gain circuit or logic block 25 may optionally be employed to modify a weight, gain, or amplification of one of more of the signals in the continuous time quadrant multiplier 22. This way, better noise cancellation is achieved, and a cleaner output is presented. Although not specifically illustration in the drawings to avoid obscuring the more significant features of the embodiments, it should be appreciated that the gain or dynamic gain input may be applied to the noise reduction and cancellation processor 30 in any one or combination of several ways and is therefore shown as an input to the processing block as a whole. The gain whether fixed, variable, adjustable, or dynamic may be applied to either or both of the voice+noise or noise only inputs (either before of after the voltage-to-current conversion), to the output of the continuous time multiplier only or in combination with application to one or both of the inputs. Embodiments of the invention may also provide for gains of different value to be applied to any one or combination of these signals or components processing the signals so that appropriately weighted gains may be applied to the different signals to achieve the desired processing result.

Further in accordance with the present invention there is optionally provided an enable/disable switch 17 (FIG. 1) that is preferably operable to enable/disable environmental noise correction, compensation, and/or counterbalanced (signal generator 20. For example, depending on the nature of the environmental noise in a particular environment, known noise reduction and or cancellation techniques might also inadvertently attenuate the voice signal that is intended to be transmitted. In such a case, it is or may be preferable that the noise reduction and or cancellation features of the present invention be disabled, at least for a limited period of time, until the environmental noise is such that it can be more effectively distinguished from the voice signal and attenuated independently. For example, a mobile or fixed location telephone user may want to call a friend from a noisy public event (e.g., a concert or sporting event) for the main purpose of letting the friend hear the background noise of the crowd. In such a case, the switch 17 is preferably manipulated to disable the noise reduction and or cancellation features of the present invention.

Having now described aspects of embodiments of the inventive noise reduction and cancellation processing block 30 relative to microphones and the other components of the communications device such as a cellular telephone, we now describe the relationship of these processing block 30 relative to a conventional cellular telephone architecture to illustrate the relationship between the inventive processing block and the analog baseband/voiceband CODEC or other stage of a communications device that normally receives the electrical signal output by the microphone.

FIG. 3 illustrates a block diagram typical of the major functional blocks of a cellular telephone of the type not having the noise reduction and cancellation processing of the invention. This architecture is described so that the manner in which the invention interoperates with and improves the performance may be better understood.

RF section 41 includes a transmit section 42 and a receive section 43 and is where the RF signal is filtered and down-converted to analog baseband signals for the receive signal. It is also where analog baseband signals are filtered and then up-converted and amplified to RF for the transmit signal. Analog Baseband 45 is where analog baseband signals from RF receiver section 44 are filtered, sampled, and digitized before being fed to the Digital Signal Processing (DSP) section 46. It is also where coded speech digital information from the DSP section are sampled and converted to analog baseband signals which are then fed to the RF transmitter section 43. It will be understood that no radio-frequency (RF) section or antenna would be required for a wired line implementation.

The Voiceband Codec (VoCoder) 47 is where voice speech from the microphone 11 is digitized and coded to a certain bit rate (for example, 13 kbps for GSM) using the appropriate coding scheme (balance between perceived quality of the compressed speech and the overall cellular system capacity and cost). It is also where the received voice call binary information are decoded and converted in the speaker or speakerphone 48.

The digital signal processor (DSP) 46 is a highly customized processor designed to perform signal-manipulation calculations at high speed. The microprocessor 48 handles all of the housekeeping chores for the keyboard and display, deals with command and control signaling with the base station and also coordinates the rest of the functions on the board.

The ROM, SRAM, and Flash memory chips 49 provide storage for the phone's operating system and customizable features, such as the phone directory. The SIM card 50 belongs to this category; it stores the subscriber's identification number and other network information.

Power Management/DC-DC converter section 52 regulates from the battery 53 all the voltages required to the different phone sections. Battery charger 54 is responsible for charging the battery and maintaining it in a charged state.

Keypad 55 and display 13 provide an interface between a user and the internal components and operational features of the telephone.

It will be apparent to those workers skilled in the art that the inventive noise reduction and cancellation block is interposed or coupled between the single microphone 11 of the telephone in its conventional configuration and the analog baseband/voiceband CODEC of the conventional telephone. In fact the output of the noise reduction processing block 30 may be seen to be a processed version of the original microphone input and may connect at the same microphone input port as in a conventional phone. Not shown in the drawing is a possible connection between the noise reduction processing block 30 and the battery 53 (or the power management block 52 (depending upon implementation) that might be needed for a cellular telephone, but may not generally be needed for a wire lined device. The noise reduction processing block 30 may optionally rely on a separate power source such as an auxiliary battery that only powers the noise reduction processing block 30. It will also be appreciated that a wire lined device would not require a battery or battery charger and would receive electrical power (voltage and current) from other electrical supply sources within the device.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

All the above references and U.S. patents and applications are incorporated herein by reference. Aspects of the invention can be modified, if necessary, to employ the systems, functions and concepts of the various patents and applications described above to provide yet further embodiments of the invention.

These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms. Accordingly, the inventors reserve the right to add additional claims after filing the application to pursue such additional claim forms for other aspects of the invention.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

We claim:

1. A communications device, comprising:

a speaker containing an input of both voice and environmental noise;

a first transmit microphone having a first microphone output providing a first signal containing substantially only environmental noise;

an environmental noise counterbalanced (correction) signal generator having (i) an environmental noise counterbalanced (correction) signal generator input connected to both the speaker input and the second microphone output and (ii) an environmental noise counterbalanced (correction) signal generator output;

a continuous time quadrant multiplier or a discrete time processor having (i) a first continuous time quadrant multiplication input in communication with the first input signal to the speaker and (ii) a second continuous time quadrant multiplication input connected to the environmental noise counterbalanced (correction) signal generator output and (iii) a multiplication output;

a dynamic gain circuit for providing a dynamic gain signal to the continuous time quadrant multiplication;

a receiver having a received input connected to the multiplication output after receiving from the antenna;

a discrete time unit or processing block with or without signal processing interposed between the first microphone and the continuous time quadrant multiplication;

wherein environmental noise picked up by the recipient and by the second microphone is processed by the environmental noise counterbalanced (correction) signal generator and wherein the environmental noise is attenuated at the speaker recipient unit after being passed through the receiver.

2. The communications device of claim 1, wherein the second microphone is spatially distant from the communications device.

3. The communications device of claim 1, further comprising a second microphone, different from the first transmit microphone, having a second microphone output providing a second signal containing substantially only environmental noise.

4. A noise compensation device for a communications apparatus, comprising:

a receive input port for receiving a remote user's spoken voice electrical signal and optionally a component of environmental noise signal from the speakers location;

a microphone for receiving an acoustic air pressure input signal at a location including at least a component of local environmental noise at the speaker's location and for converting the acoustic air pressure input signal into a time varying electrical signal representing the acoustic air pressure input signal at the location;

a speaker transducer for converting an electrical signal representing a time sequence of sounds into a time varying acoustical signal within a human hearing audio frequency range;

a first microphone transducer for converting an audio frequency range signal existing in a local environment of the communications apparatus into an electrical signal representing the local audio frequency range signal from the local environment;

an environmental noise correction or compensation signal generator having: (i) an environmental noise correction or compensation signal generator input port for receiving at least a signal derived from the first microphone output, and (ii) an environmental noise correction or compensation signal output port for communicating an environmental noise correction or compensation output signal;

a continuous time quadrant multiplier or a discrete time processor having: (i) a first multiplier input in communication with the first input signal to the speaker, and (ii) a second multiplier input connected to the environmental noise counterbalanced (correction) signal generator output and (iii) a multiplication output; and a receiver having a received input connected to the multiplication output after receiving from the antenna, wherein environmental noise picked up by the recipient and by the second microphone is processed by the environmental noise counterbalanced (correction) signal generator and wherein the environmental noise is attenuated at the speaker recipient unit after being passed through the receiver.

5. A noise compensation device as in claim 4, further comprising:

a second microphone, different from the transmit microphone, having a microphone output providing a second signal containing substantially only environmental noise.

6. A noise compensation device, comprising:

a first microphone generating a noise signal output;

an environmental and ambient noise correction circuit having a first input for receiving the noise signal from the first microphone and a second input for a voice signal from a receiver and generating a correction signal from the first and second inputs;

a continuous time quadrant multiplier or a discrete time processor having a first input for receiving the correction signal output by the environmental noise correction circuit and a second input for receiving the voice signal from the receiver and generating an output signal that is a noise reduced version of the voice signal;

a dynamic gain circuit for modifying a gain of a component of the continuous time quadrant multiplier;

a switch for switching the first microphone between a voice sensing mode during a period of speech and a noise sensing mode during periods of listening;

the receiver generating the voice signal; and a discrete time processor receiving the voice signal from the receiver and performing a discrete time processing operation on the voice signal before providing it to the continuous time quadrant multiplier.

7. A noise compensation device as in claim 6, further comprising a second microphone exclusively for generating a noise signal during periods of non-speech.

* * * * *

UNITED STATES PATENT AND TRADEMARK OFFICE

CERTIFICATE OF CORRECTION

PATENT NO. : 7,742,790 B2
APPLICATION NO. : 11/749927
DATED : June 22, 2010
INVENTOR(S) : Alon Konchitsky and William Martin Ribble It is certified that error appears in the above-identified patent and that said Letters Patent is hereby corrected as shown below:

Column 10, line 58 in claim 1 replace “second microphone” with “first microphone”
Column 11, line 9 in claim 1 replace “second microphone” with “first microphone”
Column 11, line 15 in claim 2 replace “second microphone” with “first microphone”
Column 11, line 37 in claim 4 replace “a first microphone transducer” with “a microphone transducer”
Column 11, line 45 in claim 4 replace “the first microphone” with “the microphone”
Column 12, line 10 in claim 4 replace “the second microphone” with “the microphone”
Column 12, line 17-18 in claim 5 replace “the transmit microphone” with “the microphone”

Signed and Sealed this
Third Day of July, 2012

David J. Kappos
*Director of the United States Patent and Trademark Office*